(12) United States Patent
Basson et al.

(10) Patent No.: US 10,049,593 B2
(45) Date of Patent: Aug. 14, 2018

(54) AUTOMATED EDUCATIONAL SYSTEM

(71) Applicant: International Business Machines Corporation, Armonk, NY (US)

(72) Inventors: Sara H. Basson, White Plains, NY (US); Robert G. Farrell, Cornwall, NY (US); Dimitri Kanevsky, Ossining, NY (US); Frances W. West, Newton, MA (US)

(73) Assignee: International Business Machines Corporation, Armonk, NY (US)

( * ) Notice: Subject to any disclaimer, the term of this patent is extended or adjusted under 35 U.S.C. 154(b) by 184 days.

(21) Appl. No.: 13/941,876

(22) Filed: Jul. 15, 2013

(65) Prior Publication Data

US 2015/0017626 A1  Jan. 15, 2015

(51) Int. Cl.
*G09B 7/08* (2006.01)

(52) U.S. Cl.
CPC ..................................... *G09B 7/08* (2013.01)

(58) Field of Classification Search
CPC ....................................................... G09B 7/08
USPC .......................................... 434/353; 464/353
See application file for complete search history.

(56) References Cited

U.S. PATENT DOCUMENTS

| | | | |
|---|---|---|---|
| 6,808,393 B2 | 10/2004 | Mascarenhas | |
| 2002/0160347 A1* | 10/2002 | Wallace et al. | 434/322 |
| 2003/0059750 A1* | 3/2003 | Bindler et al. | 434/236 |
| 2003/0087218 A1 | 5/2003 | Brown et al. | |
| 2006/0024649 A1 | 2/2006 | Vernon | |
| 2008/0038708 A1* | 2/2008 | Slivka et al. | 434/350 |
| 2009/0075246 A1 | 3/2009 | Stevens | |
| 2010/0099071 A1 | 4/2010 | Abrahamson et al. | |
| 2012/0164620 A1 | 6/2012 | Needham et al. | |
| 2012/0251992 A1 | 10/2012 | Huerta | |

OTHER PUBLICATIONS http://www.nationalmathandscience.org/solutions/challenges, National Math + Science Initiative, "The STEM Crisis", Jul. 12, 2013.
http://www.amsciepub.com/doi/abs/10.2466/pms.1987.64.3c.1275, Ammons Scientific, "Facilitative Effects of Gaze Upon Learning", James V. Sherwood, Jul. 12, 2013.
http://www.fitbit.com, Fitbit® Official Site: Flex, One & Zip Wireless Activity & Sleep Trackers, "Introducing Flex™", Jul. 12, 2013.
http://www.csun.edu/pubrels/clips/clips08-09/July08/07-23-08F.pdf, The Chronicle of Higher Education, Information Technology, "New Systems Keep a Close Eye on Online Students at Home", by Andrea Foster, Issue Date: Jul. 25, 2008.

(Continued)

*Primary Examiner* — Robert P Bullington
(74) *Attorney, Agent, or Firm* — Alexis N. Hatzis

(57) ABSTRACT

A method and system for providing computerized education may provide a user with a first set of educational segments such as problem sets or presentations, and may further monitor the user's reactions and responses using electronic devices, including biometric sensors, to identify difficulty points. Reports may be generated and presented to the user or another party to assist in manual identification of the difficulty point. New or modified educational segments may be provided to the user based on the identified difficulty points.

14 Claims, 4 Drawing Sheets

(56) References Cited

OTHER PUBLICATIONS

Cristina Conati et al., "Using Bayesian Networks to Manage Uncertainty in Student Modeling", User Modeling and User-Adapted Interaction, vol. 12, pp. 371-417, 2002.

Peter Mell et al., "The NIST Definition of Cloud Computing", National Institute of Standards and Technology, Information Technology Laboratory, Version 15, Oct. 7, 2009.

Steven Ritter et al., "Cognitive Tutor: Applied research in mathematics education", Psychonomic Bulletin & Review 2007, 14 (2), pp. 249-255.

* cited by examiner

US 10,049,593 B2

AUTOMATED EDUCATIONAL SYSTEM

FIELD

The present application relates generally to automated computer systems and more specifically to educational computer systems.

BACKGROUND

A key challenge in addressing increasing numbers of students and a lack of teaching resources in educational settings (including students in traditional schools or professionals seeking development) is the difficulty for educators to focus on and identify individual students' behaviors and needs in response to the educational material they receive. The spread of technology platforms into such educational settings provides an opportunity to offer automated solutions that can increase individual attention and service over a large population.

BRIEF SUMMARY

According to one aspect of the disclosed invention, a method for providing computerized education includes providing a user with a first set of educational segments and monitoring a response set by the user to the first set of educational segments. The method also includes identifying a set of difficulty points in the first set of educational segments by analyzing the user's response set, and providing a second set of educational segments to the user based on the identified set of difficulty points.

A system for providing computerized education, according to an aspect of the disclosed invention, includes a computer having a processor, and a computer-readable storage device. The system also includes a program embodied on the storage device for execution by the processor. The program includes a plurality of program modules. A first providing module provides a user with a first set of educational segments. A monitoring module monitors a response set by the user to the first set of educational segments. An identifying module identifies a set of difficulty points in the first set of educational segments by analyzing the user's response set. A second providing module provides a second set of educational segments to the user based on the identified set of difficulty points.

A computer program product for providing education on a computer device, according to an aspect of the disclosed invention, includes a computer-readable storage medium having program code embodied therewith. The program code readable/executable by a processor of a computer to perform a method. The method provides a user with a first set of educational segments and monitors a response set by the user to the first set of educational segments. The method also identifies a set of difficulty points in the first set of educational segments by analyzing the user's response set, and provides a second set of educational segments to the user based on the identified set of difficulty points.

Further features as well as the structure and operation of various embodiments are described in detail below with reference to the accompanying drawings. In the drawings, like reference numbers indicate identical or functionally similar elements.

DETAILED DESCRIPTION

Figure 1A:
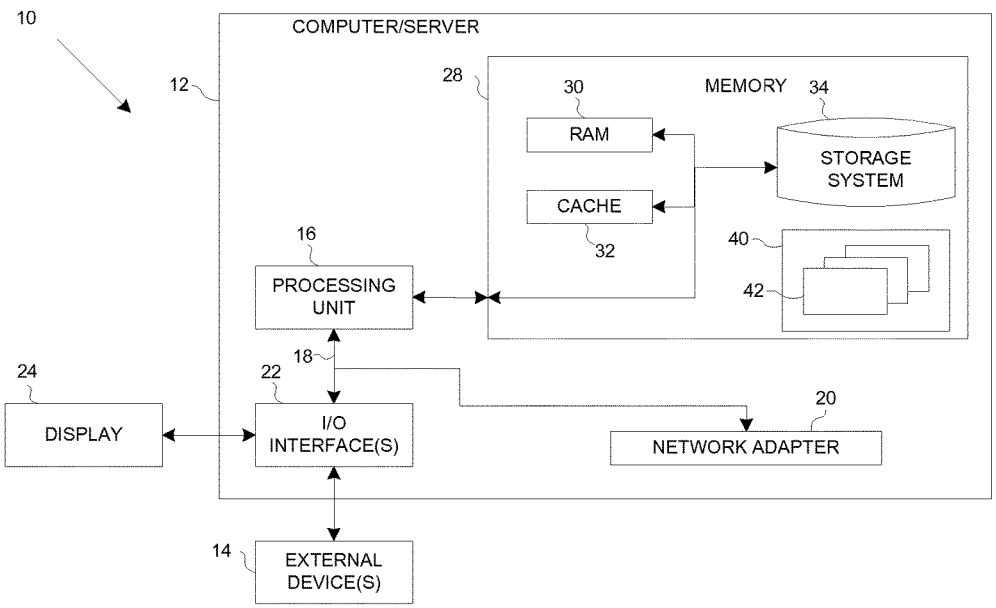
FIG. 1A is a schematic block diagram depicting a computer system according to an exemplary embodiment of the disclosed invention.

Referring to FIG. 1A, a schematic of an exemplary computing system is shown. The computer system 10 is one example of a suitable computer system and is not intended to suggest any limitation as to the scope of use or functionality of embodiments of the invention described herein.

In the computer system 10, shown in FIG. 1A, a computer/server 12 is operational with numerous other general purpose or special purpose computing system environments or configurations. Examples of well-known computing systems, environments, and/or configurations that may be suitable for use with the computer/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer/server 12 may be described in the general context of computer system-executable instructions, such as program modules, being executed by the computer system 10. Generally, program modules may include routines, programs, objects, components, logic, data structures, and so on that perform particular tasks or implement particular abstract data types. The computer/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1A, the computer/server 12 in the computer system 10 is shown in the form of a general-purpose computing device. The components of the computer/server 12 may include, but are not limited to, one or more processors or processing units 16, a system memory 28, and a bus 18 that couples various system components including the system memory 28 to the processor 16.

The bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

The computer/server 12 typically includes a variety of computer system readable media. Such media may be any available media that is accessible by the computer/server 12, and it includes both volatile and non-volatile media, removable and non-removable media.

The system memory 28 can include computer system readable media in the form of volatile memory, such as random access memory (RAM) 30 and/or cache memory 32. The computer/server 12 may further include other removable/non-removable, volatile/non-volatile computer system storage media. By way of example only, the storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 18 by one or more data media interfaces. As will be further depicted and described below, the memory 28 may include at least one program product having a set (e.g., at least one) of program modules that are configured to carry out the functions of embodiments of the invention.

The program/utility 40, having a set (at least one) of program modules 42, may be stored in the memory 28 by way of example, and not limitation, as well as an operating system, one or more application programs, other program modules, and program data. Each of the operating system, one or more application programs, other program modules, and program data or some combination thereof, may include an implementation of a networking environment. The program modules 42 generally carry out the functions and/or methodologies of embodiments of the invention as described herein.

The computer/server 12 may also communicate with one or more external devices 14 such as a keyboard, a pointing device, a display 24, etc.; one or more devices that enable a user to interact with the computer/server 12; and/or any devices (e.g., network card, modem, etc.) that enable the computer/server 12 to communicate with one or more other computing devices. Such communication can occur via Input/Output (I/O) interfaces 22. Still yet, computer the system/server 12 can communicate with one or more networks such as a local area network (LAN), a general wide area network (WAN), and/or a public network (e.g., the Internet) via a network adapter 20. As depicted, the network adapter 20 communicates with the other components of the computer/server 12 via the bus 18. It should be understood that although not shown, other hardware and/or software components could be used in conjunction with the computer/server 12. Examples, include, but are not limited to: microcode, device drivers, redundant processing units, external disk drive arrays, RAID systems, tape drives, and data archival storage systems, etc.

Figure 1B:
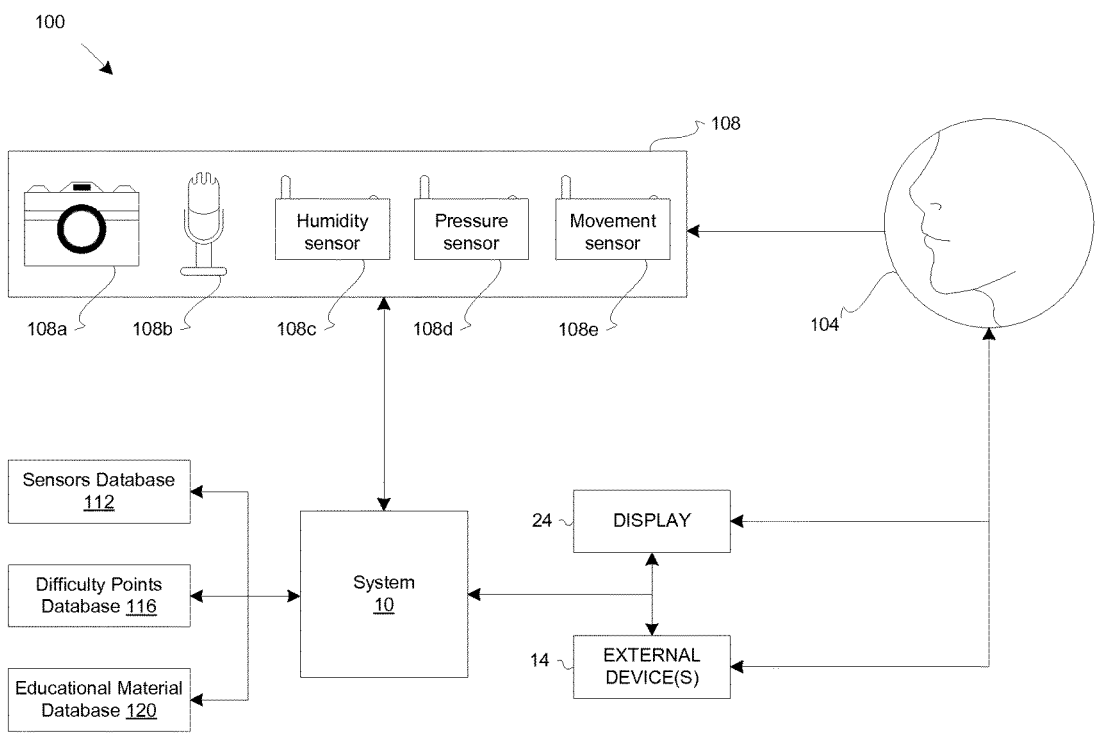
FIG. 1B is a schematic block diagram depicting an education environment using the computer system depicted in FIG. 1A, according to an exemplary embodiment of the disclosed invention.

Referring now to FIGS. 1A-B, according to an exemplary embodiment of the disclosed invention, a learning environment 100 may include a computer system 10 as described in FIG. 1A, including a display 24 and other external devices 14 for communication with a user 104. The system 10 may execute a program 40 (not shown) to implement a method according to an embodiment of the disclosed invention, described in detail below in connection with FIG. 2. The system 10 may additionally communicate with one or more biometric sensors 108, including, without limitation: a camera (photography and/or video) 108a, a microphone 108b, a humidity sensor 108c, a pressure sensor 108d, and a movement sensor 108e. The biometric sensors monitor and detect changes in the user's 104 biometrics. Other sensors and/or devices 14 may be used to detect other behavior by user 104 (such as reaction time). The system 10 communicates with one or more databases including, for example, a sensors database 112, a difficulty points database 116, and a tasks database 120, which are described more fully in connection with a method depicted in FIG. 2.

Referring now to FIG. 1B, according to aspects of the disclosed invention, the biometric sensors 108 and the biometrics they detect may be as follows: (1) the camera 108a may be focused on the user's face to detect changes in gaze or facial expressions (e.g. frowning, yawning, etc.); alternatively, or additionally, the camera 108a may be focused on a piece of paper or other object used by the user 104 to perform work; (2) the microphone 108b may be placed in front of the user 104 to detect a variety of sounds including responses and/or reactions to stimuli (e.g., grunts, pauses, hesitation, or anxiety); (3) the humidity sensor 108c may be placed on or near the user 104 to measure perspiration; (4) the pressure sensor 108d may be placed on the user's 104 wrist to measure the user's 104 pulse; (5) the movement sensor 108e may be placed on or near the user 104 to detect sudden movements by the user 104. Other biometric sensors may also be used. Using a brain scan (not shown), for example, the user's 104 brain activity may be monitored. In the case of each biometric sensor 108, the detected behavior may be associated with different physical and/or emotional reactions by the user 104 in response to stimuli presented to the user 104 by the system 10 (as discussed more fully below and in connection with FIG. 2). The user's 104 responses or reactions may be interpreted by the system 10 according to their customary interpretations (for example, a frown coupled with squinting of the eyes may be interpreted as a sign of confusion), or they may be defined differently in various embodiments of the disclosed invention. Furthermore, such biometrics may be used to indicate the level of effort exerted by the user in reaction or in response to the educational material. As used herein, each of the terms "reaction" and "response" shall mean "reaction and/or response". Embodiments of the invention may monitor and/or receive, sense, or record a single reaction/response or a set of reactions/responses.

With continued reference to FIG. 1B, the system 10 may communicate with the user 104 through one or more devices, which may be the display 24 or other external devices 14 (although it is not necessary for such devices to be external). These devices may allow the user 104 to receive stimuli from the system 10 and interact with it through the program 40 (shown in FIG. 1) that implements a method (shown in FIG. 2) according to an embodiment of the disclosed invention, as described below.

Figure 2:
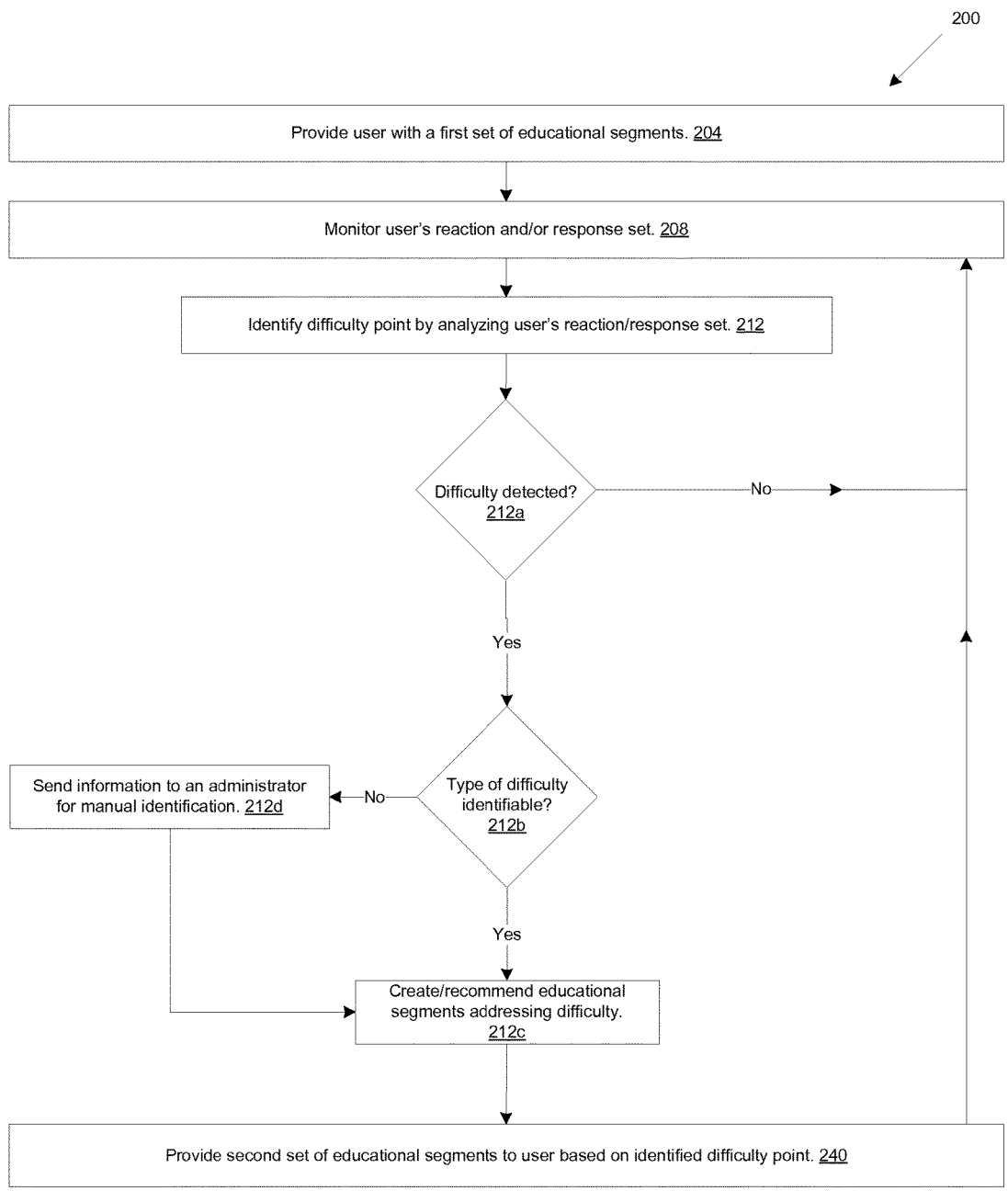
FIG. 2 is a flowchart depicting a method for providing automated education according to an exemplary embodiment of the disclosed invention.

Referring now to FIGS. 1A-2, a method 200, according to an exemplary embodiment of the disclosed invention, provides the user 104 in the educational environment 100 with a first set of educational material in step 204. The method 200 may be, for example, a program 40 executed on the system 10 (as shown in FIGS. 1A-B). The educational material may be, for example and without limitation: a single problem or question, a problem or question set, a presentation or lecture, or an exam. Some educational material may be interactive and prompt the user 104 for responses (for example, by providing an answer to a question), while others may be entirely non-interactive.

With continued reference to FIGS. 1A-2, the educational material may have one or more segments (or points, which may be considered as a zero-length segment(s) that nevertheless identifies part(s) of the educational material), which may be stored in an educational material database 120. Each segment may include constituent segments. Segments of the educational material may be defined prior to communicating the educational material to the user 104. Examples of segments in educational material include: a point in time (e.g. 5 minutes after beginning a problem set or presentation); a place or region (e.g. location in a diagram, or a sentence on a page); difficulty levels (e.g. subsets of problems/questions or constituent segments all at a given difficulty level); items requiring responses; general categories and/or subcategories that define the problem (for example, the general category for one problem may be mathematics, and the subcategory may be geometry); and discrete steps required to solve the problem (for example, solving a geometry problem may require steps of reading dimensions of a geometric figure conveyed through a sentence, drawing the corresponding geometric figure on a piece of paper or on an electronic device, and solving the problem using the drawn geometric figure). Examples of segments in an entirely instructional educational material may be: discrete portions of a presentation shown through slides (where each slide may be defined as a segment); and parts of a video, audio, or oral presentation corresponding to a time interval between a given time x and a later time y. According to a related embodiment, segmentation of the educational material such as Problem Set 1 may be facilitated through an annotation functionality, whereby discrete portions of the educational material may be defined and tagged using keywords that define, identify and/or reference the topics or other segment information associated with a given portion of the educational material. Such annotations may also be used to define levels of difficulty for each segment and/or constituent segment.

The definition, organization and communication of the segments of the educational material may be configurable by a user, such as the user 104 to whom the educational material is presented (e.g. a student may select educational material and segments that address the student's educational needs), or an instructor, administrator, or other user (not shown) who facilitates the presentation to the user 104.

With continued reference to FIGS. 1A-2, the first set of educational material may be, for example, a mathematical problem set ("Problem Set 1"). Problem Set 1 may include, for example, segments covering a range of mathematical topics such as algebra, geometry, trigonometry, discrete mathematics, etc., wherein each segment may correspond to one or more individual problems. Alternatively, or in addition, Problem Set 1 may include one or more segments for each individual problem in Problem Set 1 that delineate different portions of that problem.

The method 200 may provide Problem Set 1 to the user 104 through, for example, the display 24 or one or more of the external devices 14. According to other exemplary embodiments, the method 200 may, through the system 10 operating in a network or cloud-computing environment, provide Problem Set 1 to multiple users 104 on individual terminals or nodes, each of which may also be a system 10. For example, a system 10 operating as a server may select a series of problems to be included in Problem Set 1 and transmit them to computers used by students in a classroom.

With continued reference to FIGS. 1A-2, the method 200 may monitor the user 104 in step 208 to detect the user's 104 reaction and/or response to Problem Set 1. Monitoring the user 104 may include using one or more of the external devices 14 or one or more of the biometric sensors 108, or both. For example, if the user 104 receives Problem Set 1 on a computer screen having a keyboard for entering response, the method 200 may receive those responses in step 208. The method 200 may further detect, as part of the monitoring function of step 208, the time elapsed between the presentation of each problem in Problem Set 1 (or portions thereof) and the time at which user 104 submits a response. The method 200 may further detect whether and how many times the user 104 changes any responses, whether the user 104 skips any problems or consults any available reference resources, etc. Through the biometric sensors 108, the method 200 may monitor the user's 104 gaze, facial expressions, perspiration, pulse, movements, brain activity, etc., to detect the user's 104 biometrics.

With continued reference to FIGS. 1A-2, as part of the monitoring functionality of step 208, the method 200 may identify baseline responses and reactions of the user 104 or other users, which may be used as baseline reference points in the method's 200 other steps that analyze the user's 104 responses and reactions to Problem Set 1. For example, as the method 200 is used over time by increasing numbers of users, common responses and reactions may be noted by the method 200 and retained, for example, in a sensors database 112. The user's 104 own history of responses and reactions may also be used to define such baseline metrics for that user 104. According to one embodiment, the method 200 may, in step 208, present the user 104 with one or more sets of educational material designed to be easy and manageable. For example, the user 104 may be asked to provide the user's 104 name and address, or to identify common objects. Alternatively, the user 104 may be presented with information such as date and time. As explained more fully below, one purpose of monitoring the user's 104 reactions and responses in step 208 is to allow the method 200, in other steps, to determine whether those reactions and response indicate difficulty points for the user 104. By presenting the user 104 using with information not likely to present a difficulty point, the method 200 may establish baseline reactions and responses in the user 104.

With continued reference to FIGS. 1A-2, the method 200 may analyze, in step 212, the user's 104 reactions and/or responses to Problem Set 1 (obtained through monitoring in step 208). Through this analysis, the method 200 may identify difficulty points experienced by the user 104. The method 200 may also store the identified difficulty points in a database 116, which may be accessible by the system 10. Such difficulty points may be used to modify the educational material presented to the user 104 during a current or future educational session in the educational environment 100.

The step of identifying a difficulty point in step 212 may include determining or detecting, in step 212*a*, whether the user 104 exhibits any signs of difficulty while presented with Problem Set 1 (or other educational material, as the case may be). In analyzing the user's 104 reactions and/or responses, the method 200 preferably may compare them to baseline reactions and responses for a comparable group or population, which may have been stored in a sensors database 112 and a difficulty points database 116. If the user 104 is a high school student, for example, the user's 104 reactions/responses may be compared to those of other high school students in a comparable geographical area (such as a particular city, school district, state, or country). Spending four minutes on answering a problem in Problem Set 1 may be normal for a high school student, whereas it may be indicative of a difficulty point for a college student. As another example, the method 200 may compare the user's 104 pulse to a baseline pulse of comparable users in comparable settings. The baseline pulse may be higher in an exam-taking environment, for example, than it may be during a self-administered set of homework exercises.

Whatever the baseline may be, the method 200 may note, in step 212a, if the user's 104 reactions and responses differ from the baseline (or predefined) reactions and responses. For example, if the user's 104 pulse is higher than the baseline while answering a particular problem in Problem Set 1 (or while presented with a segment of the educational material), it may be that the user 104 finds the particular problem difficult. If no difficulty point is detected in step 212a, the method 200 may continue to monitor the user's 104 reactions/responses in step 208.

Related embodiments of the invention may allow user-specific calibration of the biometric sensors 108 or other devices through which the user 104 may interact with the system 10 and the method 200. For example, some users 104 may perspire more than others. In this case, it may not be appropriate to use the readings from the humidity sensor 108c to detect a point of difficulty. Alternatively, the method 200 may compare the readings of the biometric sensors 108 (or other devices) to threshold settings that are configurable to account for user-specific characteristics or preferences. Such configurations may be defined and configured through the system 10 and stored in the sensors database 112.

With continued reference to FIGS. 1A-2, where the method 200 detects a difficulty point in step 212a, it may determine whether the difficulty type is identifiable, in step 212b. The difficulty type may correlate with the segments of Problem Set 1 as defined in the educational material database 120 (and may be defined differently in different education materials). For example, the user 104 may exhibit a delayed response (e.g. slow keystroke rates, or a hesitant oral response), a confused look, a sound indicating frustration, etc. in response or in reaction to a geometry-related segment of one or problems in Problem Set 1. The higher the frequency of the user 104 exhibiting reactions/responses indicative of a difficulty point during identical or similar segments of Problem Set 1, the more likely it is that the user 104 will benefit from increased emphasis and assistance in dealing with such segments. According to one related embodiment, the method 200 may compare the number of difficulty points experienced by the user 104 when dealing with the same segment or related segments to a threshold value. For example, if the user 104 exhibits difficulty with geometry segments at least 5 times while presented with Problem Set 1, geometry may be identified by the method 200 as a difficulty type for the user 104 in step 212b.

With continued reference to FIGS. 1A-2, if difficulties are detected in step 212a, but the difficulty type is not identifiable automatically, information about Problem Set 1 and the user's 104 reactions and responses may be presented to the user 104, a parent, a teacher, administrator, or another party (not shown), in step 212d. For example, the information may be emailed to the user's 104 parents. This functionality allows for manual review and analysis of the user's 104 responses/reactions to Problem Set 1 to understand the correlation between the detected difficulty points and their underlying causes. The manually identified information may be communicated to the method 200, and the method 200 may use such information in the same manner as where the difficulty points are detected and analyzed automatically by the method 200.

With continued reference to FIGS. 1A-2, if a difficulty is detected in step 212a and the type of difficulty is identified in step 212b, the method 200 may modify Problem Set 1 dynamically in step 212c to focus on the difficulty points. For example, if Problem Set 1 includes 50 questions and the user 104 exhibits difficulty with 5 geometry-related problems out of the first 20 questions, the method 200 may change the remaining 30 questions to focus on geometry. Alternatively, the method 200 may, in step 212c, compile a second set of problems ("Problem Set 2") for presentation or recommendation to the user 104 subsequent to the user after finishing Problem Set 1. According to a related embodiment, the method 200 may, in step 212c, modify the difficulty of the problems presented to the user 104 in the same or another problem set to teach the user 104 fundamental concepts related to the identified type of difficulty that may account for the user's 104 reactions/responses. For example, the method 200 may present the user 104 with relatively simple geometry problems to solidify the user's 104 grasp of the fundamental geometric principles.

With continued reference to FIGS. 1A-2, according to another embodiment, the method 200 may create additional problem sets in step 212c that approach the identified difficulty point in a different manner so as to avoid the difficulty point. For example, if the user's 104 difficulty arises in segments presented using text (such as text on a computer screen) the method 200 may revise Problem Set 1 so as to give oral instructions in addition to textual instruction. As a further example, if the difficulty point in solving math problems in Problem Set 1 is detected as a language difficulty (for example, for a foreign student not familiar with the language in which Problem Set 1 is presented), the method 200 may offer the same problems using alternative or enhanced language (e.g., the method 200 may offer definitions of words used in the problem or offer them in the users' 104 native language).

With continued reference to FIGS. 1A-2, the method 200 may provide Problem Set 2 (or a revised Problem Set 1) to the user 104 in step 240, based on the created/recommended educational material. If the difficulty type is not identifiable in step 212b, the method 200 may continue to provide the remaining portion of Problem Set 1. The method 200 may additionally, or alternatively, modify its means of presentation to or communication with the user 104 in step 240 based on the identified difficulty points. For example, if the difficulty point is determined to have been caused by a disability of the user 104 (e.g. a speech impediment), the method 200 may prompt the user for non-oral input. Other disabilities may be physical or mental and may be detected through using one or more of the sensors.

Embodiments of the invention may provide information on the user's 104 responses/reactions in real time, such that an instructor or presenter may take action. For example, the method 200 may alert the presenter any time that the camera 108a detects boredom in an audience. While the presenter may not necessarily change any remaining content, the presenter may change the pace and tone of the presentation so to keep the audience engaged. Similarly, a school teacher may be alerted by the method 200 that one or more students in the class appear to be confused. The teacher may then take appropriate action. Among other benefits, this feature of the invention allows the teacher to address learning difficulties that students may not self report (for example, because the students may be embarrassed to admit confusion in front of their peers).

Referring now to FIG. 1B, although the learning environment 100 depicts five biometric sensors 108 and one user 104, other embodiments of the invention may employ fewer or additional biometric sensors, and may monitor multiple users. Embodiments of the invention may include, without limitation: educational sessions presented to a single student or to multiple students by a live instructor or by an automated system; meetings; presentations; and examinations. Furthermore, the biometric sensors 108 may be part of the same or different physical devices. They may also be integrated into the system 10. Additionally, a given biometric sensor 108 may be configured to monitor a single user's 104 biometrics, whereas another biometric sensor 108 may be configured to monitor multiple users. For example, multiple cameras 108*a* may be used to individually monitor multiples users 104, whereas a single thermometer (not shown) may be used to detect an overall temperature reading for the educational environment 100.

Although discussion of the disclosed embodiments of the invention has focused primarily on problem solving by the user 104 in the educational environment 100, the stimuli presented to the user 104 by the system 10 in the educational environment may also be a presentation, requiring no specific response from the user 104. According to such embodiments, the method 200 may analyze the user's 104 reactions as described above and make a corresponding determination based on detected difficulty points.

Embodiments of the invention may also be used to identify groups of users 104 with similar learning characteristics.

Figure 3:
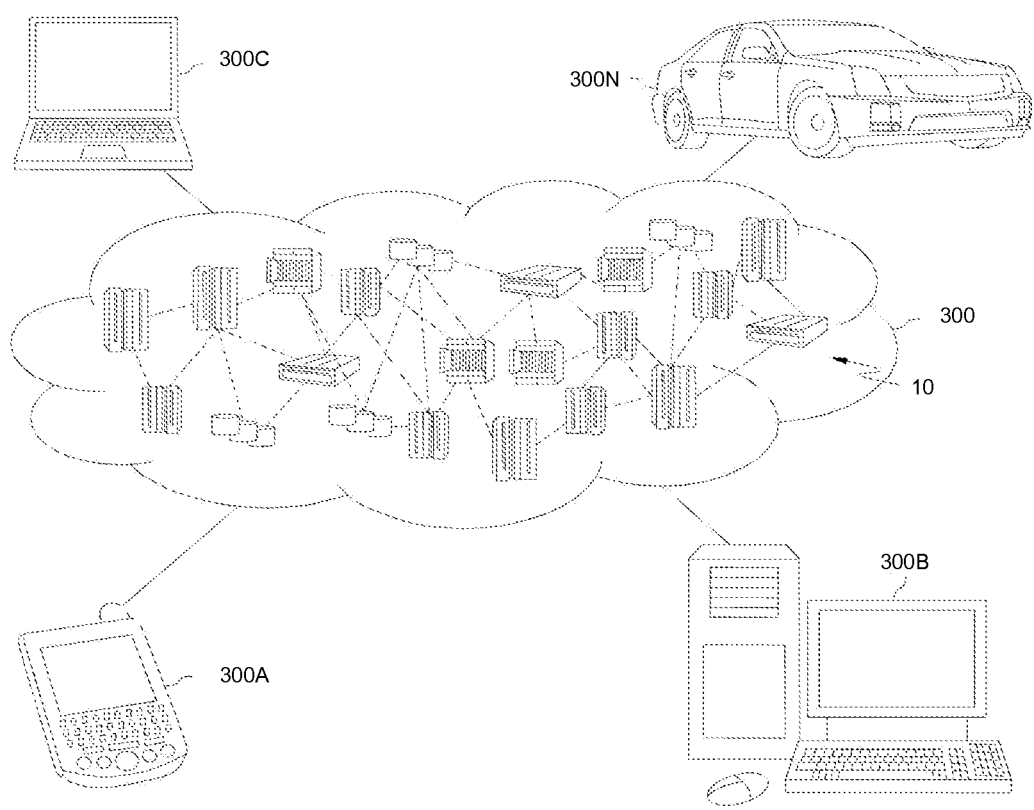
FIG. 3 is a schematic block diagram of an illustrative cloud computing environment, according to an embodiment of the disclosed invention.

Referring now to FIG. 3, an illustrative cloud computing environment 300 is depicted. As shown, the cloud computing environment 300 comprises one or more cloud computing nodes, each of which may be a system 10 with which local computing devices used by cloud consumers, such as, for example, a personal digital assistant (PDA) or a cellular telephone 300A, a desktop computer 300B, a laptop computer 300C, and/or an automobile computer system 300N, may communicate. The nodes 10 may communicate with one another. They may be grouped (not shown) physically or virtually, in one or more networks, such as Private, Community, Public, or Hybrid clouds as described hereinabove, or a combination thereof. This allows the cloud computing environment 300 to offer infrastructure, platforms and/or software as services for which a cloud consumer does not need to maintain resources on a local computing device. It is understood that the types of computing devices 300A-N shown in FIG. 3 are intended to be illustrative only and that the computing nodes 10 and the cloud computing environment 300 can communicate with any type of computerized device over any type of network and/or network addressable connection (e.g., using a web browser).

Figure 4:
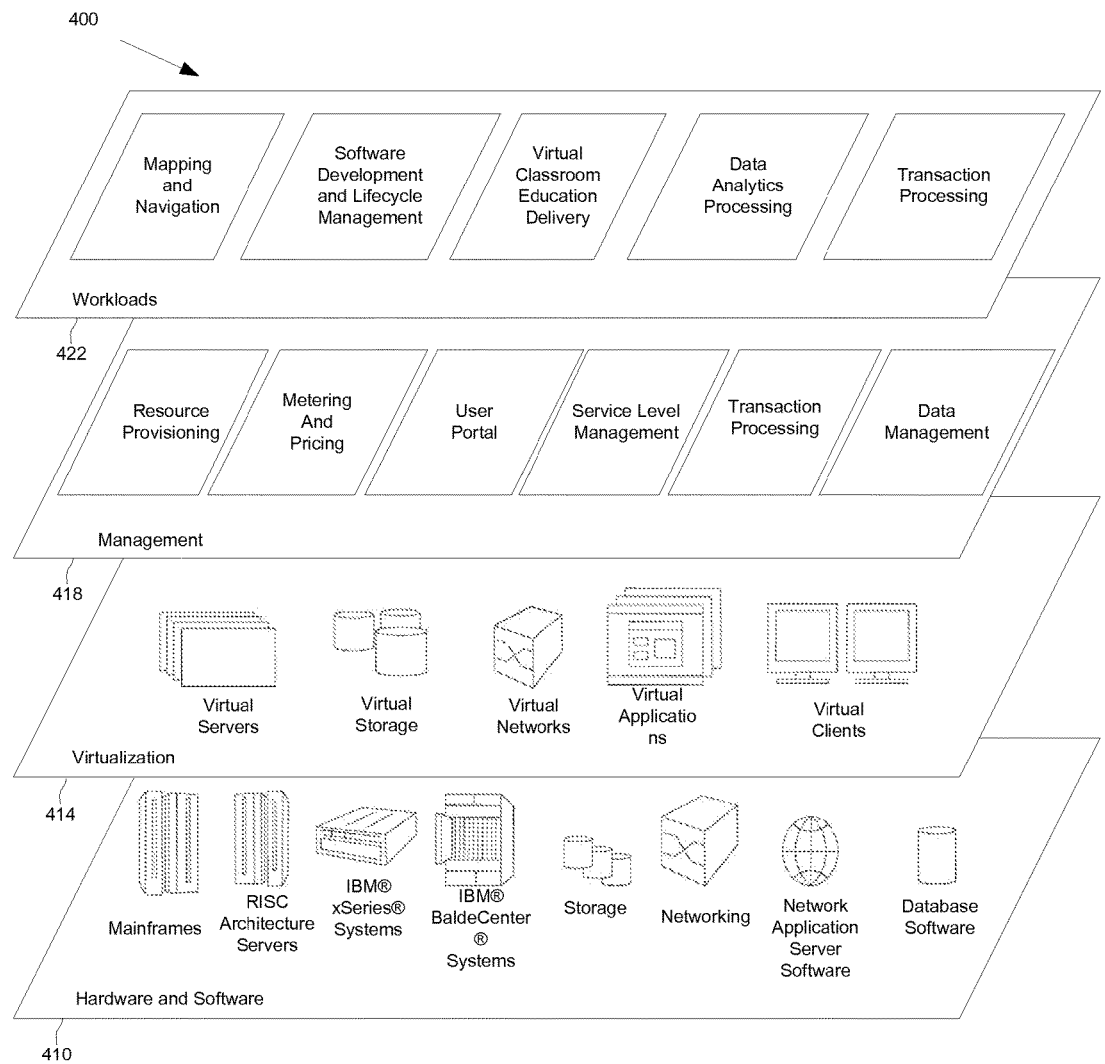
FIG. 4 is a multi-layered functional illustration of the cloud computing environment depicted in FIG. 3 according to an exemplary embodiment of the disclosed invention.

Referring now to FIG. 4, a set of functional abstraction layers provided by the cloud computing environment 300 (FIG. 3) is shown. It should be understood in advance that the components, layers, and functions shown in FIG. 4 are intended to be illustrative only and embodiments of the invention are not limited thereto. As depicted, the following layers and corresponding functions are provided.

The hardware and software layer 410 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

The virtualization layer 414 provides an abstraction layer from which the following examples of virtual entities may be provided: virtual servers; virtual storage; virtual networks, including virtual private networks; virtual applications and operating systems; and virtual clients.

In one example, the management layer 418 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

The workloads layer 422 provides examples of functionality for which the cloud computing environment may be utilized. Examples of workloads and functions which may be provided from this layer include: mapping and navigation; software development and lifecycle management; virtual classroom education delivery; data analytics processing; transaction processing; and a management system for transferring VM images 208, such as the method 100.

While the present invention is particularly shown and described with respect to preferred embodiments thereof, it will be understood by those skilled in the art that changes in forms and details may be made without departing from the spirit and scope of the present application. It is therefore intended that the present invention not be limited to the exact forms and details described and illustrated herein, but falls within the scope of the appended claims.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While steps of the disclosed method and components of the disclosed systems and environments have been sequentially or serially identified using numbers and letters, such numbering or lettering is not an indication that such steps must be performed in the order recited, and is merely provided to facilitate clear referencing of the method's steps. Furthermore, steps of the method may be performed in parallel to perform their described functionality.

We claim:

1. A method for processing biometric data using one or more biometric sensors, comprising:
   providing a user, by a processor of a computer, with a first set of educational segments, wherein the first set of educational segments comprise electronic data stored in a first database of the computer, wherein the providing is performed by at least one output device of the computer;
   capturing, by the one or more biometric sensors, a biometric response of the user to the first set of educational segments,
      wherein the captured biometric response comprises the biometric data of the user and at least one of a delayed response, a pause, or a sudden movement by the user,
      wherein the captured biometric response is captured within a time period of providing one or more portions of the first set of educational segments,
      wherein the one or more biometric sensors are selected from the group consisting of a camera, a microphone, a humidity sensor, a pressure sensor, a movement sensor, and a brain scanner; transmitting the captured biometric response to a second database of the computer;
   associating, by the processor, the captured biometric response with the one or more portions of the first set of educational segments;
   identifying, by the processor, one or more difficulty points from a set of difficulty points by analyzing the captured biometric response,
      wherein the set of difficulty points are based on one or more biometric response patterns of a group of users associated with a learning difficulty, wherein the one or more identified difficulty points are associated with the captured biometric response and the one or more portions of the first set of educational segments; and generating, by the processor, a second set of educational segments based on the one or more identified difficulty points, the second set of educational segments comprising information regarding the one or more identified difficulty points, wherein the second set of educational segments comprise the electronic data stored in the first database of the computer.

2. The method of claim 1, further comprising:

providing the user with a set of baseline segments and monitoring a baseline response set of the user to the set of baseline segments; and identifying the set of difficulty points in the first set of educational segments by analyzing a user's response set in comparison to the baseline response set of the user.

3. The method of claim 1, wherein the biometric response includes brain activity, a gaze, a facial impression, a pulse reading, or a gesture.

4. The method of claim 1, wherein the biometric response reflects a state of mind or emotions of the user.

5. The method of claim 1, wherein the biometric response reflects a physical or mental disability of the user.

6. A system for processing biometric data using one or more biometric sensors, comprising:

a computer having a processor, and a non-transitory computer-readable storage device; and a program embodied on the non-transitory computer-readable storage device for execution by the processor, the program having a plurality of program instructions, including:

providing a user, by the processor of the computer, with a first set of educational segments, wherein the first set of educational segments comprise electronic data stored in a first database of the computer, wherein the providing is performed by at least one output device of the computer;

capturing, by the one or more biometric sensors, a biometric response of the user to the first set of educational segments, wherein the captured biometric response comprises the biometric data of the user and at least one of a delayed response, a pause, or a sudden movement by the user;

wherein the captured biometric response is captured within a time period of providing one or more portions of the first set of educational segments;

wherein the one or more biometric sensors are selected from the group consisting of a camera, a microphone, a humidity sensor, a pressure sensor, a movement sensor, and a brain scanner;

transmitting the captured biometric response to a second database of the computer;

associating, by the processor, the captured biometric response with the one or more portions of the first set of educational segments;

identifying, by the processor, one or more difficulty points from a set of difficulty points by analyzing the captured biometric response, wherein the set of difficulty points are based on one or more biometric response patterns of a group of users associated with a learning difficulty, wherein the identified one or more difficulty points are associated with the captured biometric response and the one or more portions of the first set of educational segments; and generating, by the processor, a second set of educational segments based on the identified one or more difficulty points, the second set of educational segments comprising information regarding the identified one or more difficulty points, wherein the second set of educational segments comprise the electronic data stored in the first database of the computer.

7. The system of claim 6, further comprising: a plurality of additional computers each having a processor and a non-transitory computer-readable storage device for executing one or more program instructions, wherein the computer and the plurality of additional computers communicate on a computer network.

8. The system of claim 6, wherein the computer is a mobile device.

9. A non-transitory computer program product for processing biometric data using one or more biometric sensors, comprising a non-transitory computer-readable storage medium having program code embodied therewith, wherein the non-transitory computer-readable storage medium is not a transitory signal per se, the program code readable and executable by a processor of a computer to perform instructions comprising:

providing a user, by the processor of the computer, with a first set of educational segments, wherein the first set of educational segments comprise electronic data stored in a first database of the computer, wherein the providing is performed by at least one output device of the computer;

capturing, by the one or more biometric sensors, a biometric response of the user to the first set of educational segments, wherein the captured biometric response comprises the biometric data of the user and at least one of a delayed response, a pause, or a sudden movement by the user;

wherein the captured biometric response is captured within a time period of providing one or more portions of the first set of educational segments;

wherein the one or more biometric sensors are selected from the group consisting of a camera, a microphone, a humidity sensor, a pressure sensor, a movement sensor, and a brain scanner;

transmitting the captured biometric response to a second database of the computer;

associating, by the processor, the captured biometric response with the one or more portions of the first set of educational segments;

identifying, by the processor, one or more difficulty points from a set of difficulty points by analyzing the captured biometric response, wherein the set of difficulty points are based on one or more biometric response patterns of a group of users associated with a learning difficulty, wherein the one or more identified difficulty points are associated with the captured biometric response and the one or more portions of the first set of educational segments; and generating, by the processor, a second set of educational segments based on the one or more identified difficulty points, the second set of educational segments comprising information regarding the one or more identified difficulty points, wherein the second set of educational segments comprise the electronic data stored in the first database of the computer.

10. The non-transitory computer program product of claim 9, wherein the instructions further comprises:
 providing the user, by the processor, with a set of baseline segments and monitoring, by the processor, a baseline response set of the user to the set of baseline segments; and
 identifying, by the processor, the set of difficulty points in the first set of educational segments by analyzing a user's response set in comparison to the baseline response set of the user.

11. The non-transitory computer program product of claim 9, wherein the biometric response includes one or more of brain activity, a gaze, a facial impression, a pulse reading, and a gesture.

12. The non-transitory computer program product of claim 9, wherein the biometric response reflects a state of mind or emotions of the user.

13. The system of claim 6, wherein the plurality of program instructions further comprise:
 providing the user with a set of baseline segments and to monitor a baseline response set of the user to the set of baseline segments; and
 identifying the set of difficulty points in the first set of educational segments by analyzing a user's response set in comparison to the baseline response set of the user.

14. The non-transitory computer program product of claim 9, wherein the computer is a mobile device.

\* \* \* \* \*